Dec. 28, 1926.
E. R. GURNEY
1,611,906
TANK SUPPORT
Filed May 27, 1925
2 Sheets-Sheet 1
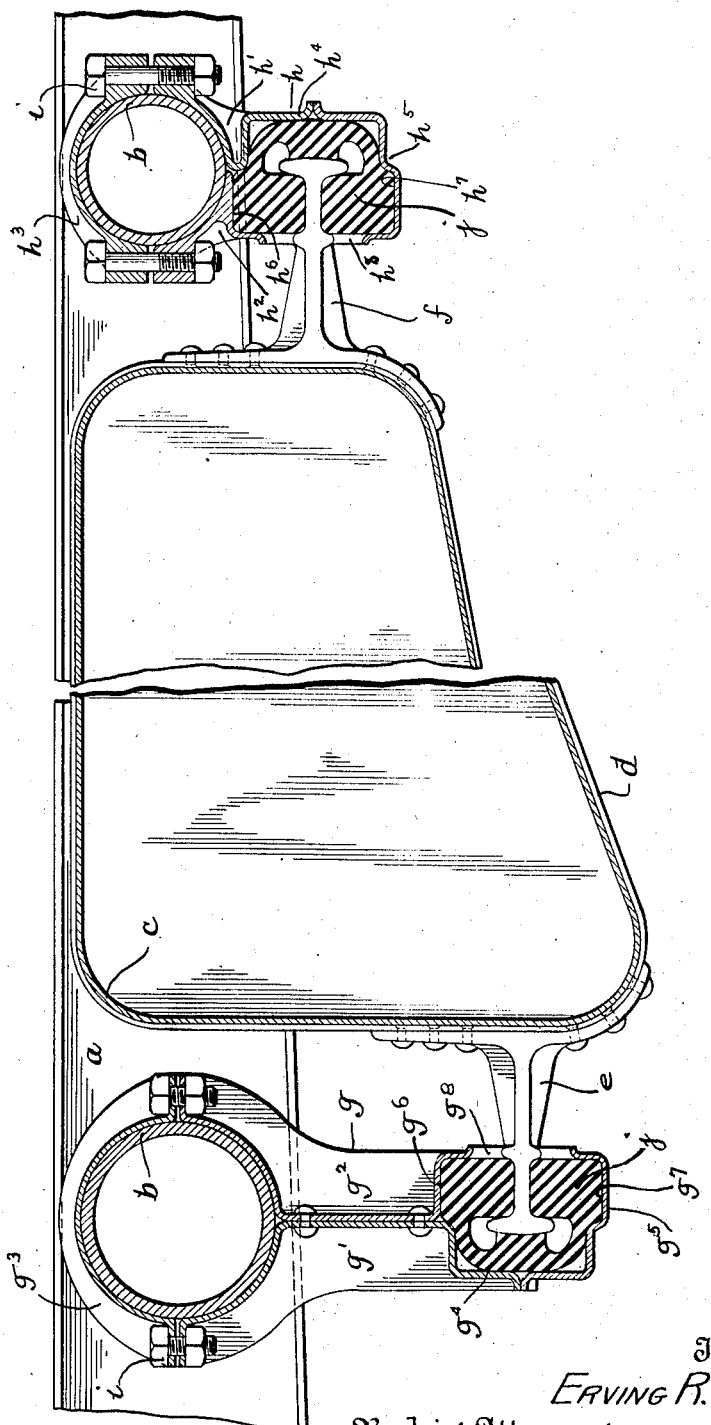
Inventor
ERVING R. GURNEY.
By his Attorneys
Redding, Greeley, O'Shea & Campbell

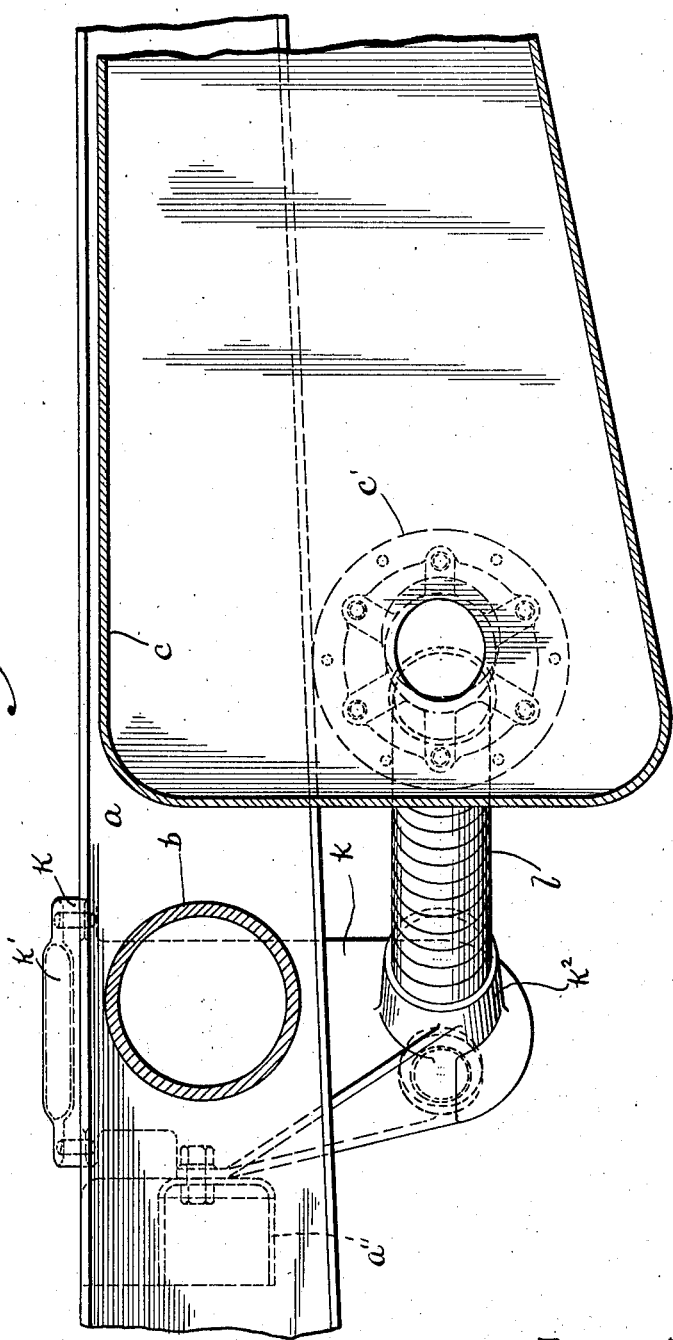

Patented Dec. 28, 1926.

1,611,906

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

TANK SUPPORT.

Application filed May 27, 1925. Serial No. 33,079.

In all motor vehicles there is some tendency of the frame to twist in traveling over inequalities in the roadbed and this tendency is particularly magnified in buses of relatively long wheel base. In the interest of large capacity the vehicle body, either bus or truck, extends laterally considerably beyond the side frame members. The present invention contemplates, in the interest of conservation of space, the disposition of the fuel tank in a motor vehicle of this character between the longitudinal side members of the chassis and toward the rear end thereof. To compensate for relative movement between the component elements of the chassis frame, it is proposed to provide connections allowing a degree of universal movement between the tank and the frame members from which it is supported. To this end wholly non-metallic yielding connections are provided between the tank and the frame members. More particularly arms carried with straps encircling the fuel tank are engaged by yielding non-metallic material, such as rubber, which may, if desired, be retained under compression within housings carried by the frame. To replenish the fuel in the tank access may be had thereto from without the vehicle body. This outlet, from practical considerations, must be supported upon a frame member and because of the relative movement between the component elements of the frame and, of course, the tank supported on the frame, the connections between the fuel inlet and the tank are subject to deleterious stresses. It is proposed, therefore, according to the present invention, to provide a connection which shall allow for such relative movement. Accordingly a flexible conduit or the like is provided between a receiver carried with an outer extremity of the frame and the fuel tank inlet. These and other objects of the invention as well as the means for their attainment will be more apparent from the following detailed description of a preferred embodiment thereof illustrated in the accompanying drawings in which:

Figure 1 is a longitudinal sectional reduced view showing a fuel tank and the yielding non-metallic cushioning connections between the tank and chassis frame of the vehicle.

Figure 2 is a fragmentary view, partly in section, showing the fuel inlet.

Referring to the drawings a side member of the chassis frame is indicated at $a$ and transverse tubular members of the frame are indicated at $b$. A fuel tank $c$ is adapted to be supported between the side frame members of the vehicle and directly carried with the transverse members $b$. Encircling the tank there are a plurality of straps, one of which is indicated at $d$, which straps may be welded or otherwise secured to the tank. Carried with the straps, as being riveted thereto, are a plurality of arms. In the illustrated embodiment an arm forwardly of the tank is illustrated at $e$ and rearwardly of the tank a similar arm is indicated at $f$. Secured to the transverse members of the chassis frame are brackets indicated in general at $g$ and $h$, respectively. One such bracket is provided for each arm. In the embodiment shown in the drawings each bracket is illustrated as formed of pressed metal sections $g'$, $g^2$, or $h'$, $h^2$, riveted or otherwise secured together and formed at the upper end with a seating surface to engage the transverse member $b$. A complementary seating member $g^3$ or $h^3$ is shown as also engaging the transverse member $b$ and bolts $i$ are provided to secure bracket $g$ and seat member $g^3$ ($h$ and $h^3$) in clamping engagement with the transverse member $b$. The lower portion of brackets $h$ and $g$, respectively, are formed as the upper part of a housing $g^4$, $h^4$, to receive respectively blocks of yielding non-metallic material $j$ engaging the arms $e$, $f$. Secured to the lower part of the housing as by bolts or the like (not shown) is a cap member $g^5$, $h^5$. The blocks are preferably of rubber and are retained between seats $g^6$, $g^7$ or $h^6$, $h^7$, respectively, in the housings under any desired degree of compression. By so retaining the rubber under compression its strength, resiliency and wearing qualities are increased. The side of the housing facing the tank is provided with an opening as at $g^8$, $h^8$, through which the respective arms $e$, $f$, enter to be engaged by the yielding non-metallic material.

It will be understood that any desired number of yielding non-metallic connections may be provided between the tank and the chassis frame. For instance, there may be two arms e at the forward end of the tank and one arm rearwardly thereof or an equal number of arms may be provided at each end.

The body of the vehicle may extend outwardly on either side of the chassis frame for a suitable distance in the interest of increased capacity and may be supported upon out-riggers $a'$ carried with the chassis frame members $a$. Carried with an outrigger, outwardly of the body, is a fuel receiver $k$ having an inlet $k'$ through which the fuel enters the receiver and which is adapted to be closed by any convenient type of closure, not shown. In the lower part of the receiver there is formed a fuel outlet $k^2$ and in the fuel tank there is formed an outlet aperture $c'$. Between the fuel outlet $k^2$ in the receiver $k$ and the inlet $c'$ in the tank there is provided a conduit $l$. Inasmuch as the tank has a tendency to move with the chassis frame as it weaves while the receiver $k$ has a still greater tendency for relative movement due to the fact that it is carried upon one of the component elements of the frame, considerable stresses are likely to be set up in the connections between the conduit $l$ and the receiver $k$ and tank $e$ which would ordinarily result in deterioration of the connections and consequent leakage. In order to prevent the imposition of these stresses, to a material extent, the conduit $l$ is formed of flexible tubing as shown.

It will thus be seen that a mounting and connections for a fuel or other tank in a motor vehicle have been provided which are capable of compensation for relative movement of the chassis frame whereby deleterious strains and stresses are not impressed upon the joints in the tank.

Various modifications may be made in the arrangement, location and configuration of the various connecting and supporting elements without departing from the spirit and scope of the invention, as will be evident to one skilled in the art, since the means provided would obviously meet the broad problem presented wherever or however it might arise.

What I claim is:

1. In a motor vehicle including transverse and side frame members, the combination with a fuel tank, of spaced housings carried with the transverse frame members, straps encircling the tank in spaced relation, arms carried with the straps, respectively, at either end of the tank and entering the housings, and yielding non-metallic material retained within the housings and engaging the ends of the arms.

2. In a motor vehicle including transverse and side frame members, the combination with a fuel tank, of housings formed of two separable members, straps encircling the tank, arms carried with the straps and entering the housings, yielding non-metallic material within the housings and engaging the ends of the arms, means to retain the yielding non-metallic material within the housings, arms formed integral with the separate parts of the housings and being formed at the ends thereof for cooperation with the transverse frame members, and means to retain said arms upon the transverse frame members.

This specification signed this 22 day of May A. D. 1925.

ERVING R. GURNEY.